Patented Oct. 21, 1930

1,779,012

UNITED STATES PATENT OFFICE

BRUNO REWALD, OF HAMBURG, GERMANY

AUXILIARY MEANS FOR LEATHER DRESSING

No Drawing. Application filed January 12, 1928, Serial No. 246,400, and in Germany July 16, 1927.

When dressing leather, the greasing of the prepared true skins is of great importance in order to make them soft and supple. The leather prepared with tanning materials does not easily take up grease, as the latter does not penetrate forthwith into the pores, but smears only over the surface. In order to obtain the effect aimed at the grease must therefore be provided with an addition of a suitable distributing agent. There has heretofore been used for distributing agents, mainly egg-yolk and in some cases Turkey-red oil, this latter however has not proved wholly satisfactory but has often produced a subsequent exudation on the leather. Egg-yolk is furthermore used in dressing glacé leather in co-operation with alum, the said egg-yolk being added to the so-called "nourishing substance" which also contains wheat flour.

The term "nourishing substance" is used in the art to cover a thin pulp containing alum, common salt, wheat flour and egg yolk, used for dressing kid, etc.

I have now found that for the purpose in question, in place of egg-yolk, phosphatides may be used with great success. The said phosphatides are met with in abundant quantities in numerous vegetable and animal substances, for example in soy beans. Often the residues which result from the purification of the said phosphatides for human food (in order to remove the substances imparting the disagreeable smell and taste) can well be used in dressing leather. These residues contain partly decomposed products of the phosphatides which products are likewise (or at least contain) organic phosphides having a great efficiency in forming emulsions.

The improved greasing agents may be produced, for example, by mixing lecithin of any quality, of animal or vegetable nature, with a fatty oil and using the mixture thus obtained for greasing the leather. In like manner a mixture of lecithin and fish oil or train oil (i. e. marine oil) may be produced which mixture is emulsified by means of water and then applied as an emulsion. As lecithin itself is a greasy substance it suffices in certain cases to produce a solution or swelling of lecithin with water and to use the product thus obtained without any further addition of grease for greasing the leather.

In order to obtain a better distribution some alkali (preferably a very little) may be added to the phosphatides of vegetable or animal origin dissolved in oil, before the mixture is emulsified with water. A lasting (or stable) and very fine emulsion may likewise be obtained by adding to the mixture of the phosphatides and fatty oil (or sulphonated fatty oil), a little bit of soap.

In the production of the various agents for making emulsions and for greasing leather, the residues obtained by treating, for example, dephlegmated soy-slime or soy-mucilage with acetic ether for obtaining vegetable lecithin, may advantageously be employed. The main quantity of the phosphatides is not thereby dissolved; the constituent parts not dissolved are separated and worked up for human food. In the solution, there remains, besides oil, considerable quantities of phosphatides and cleavage products of the same, which are freed from the acetic ether by distilling. This residue is emulsified with water, is provided, if convenient or necessary, with a small addition of alkali or ammonia, and may then be employed as a greasing emulsion.

The various mixtures may contain in an appropriate manner also a sulfonated fatty oil and a phosphatide alone or with the addition of a fat or mineral oil.

Up to date in the manufacture of glacé leather egg-yolk could not be dispensed with on account of its "alum permanency". The term "alum permanency" is used in the art to denote that the substance, when present in the "nourishing substance" does not become decomposed by reaction with the alum present therein, to cause a precipitation and separation. But according to the present invention the egg-yolk may be replaced by vegetable or animal phosphatides, if aromatic or aliphatic sulphonic acids are simultaneously added to the nourishing substance as then a great alum permanency is attained. Furthermore it is advantageous to also add for this purpose to the dressed leather, small quantities for example 5 to 10 percent of an albumen. The albumen obtained from soy beans is especially adapted for this purpose. In this case the addition of a sulphonic acid is not necessary.

The invention may be explained with the help of some examples of execution.

*Example 1*

The previously crushed or squashed soy-beans are extracted with a mixture of benzol and alcohol. This solvent takes up the oil as well as the phosphatides and is then evaporated. The phosphatides are precipitated in the oil by introducing steam and thereupon separated from the oil. In thus separating the phosphatides, a substantial amount of oil will be carried by the phosphatides. Much of this oil can be removed from the phosphatides by centrifugal action, and the phosphatides can then be freed from any moisture adhering thereto by drying. Thus a fatty mass is obtained which is composed of about 70 parts of phosphatides and 30 parts of soy-oil and which is adapted to further be mixed with fat oils, for example soy-bean oil and to be adjusted by a sufficient addition of the same in such a manner that the said mass may easily and uniformly be distributed and employed for leather dressing purposes.

*Example 2*

5 to 10 percent of vegetable lecithin obtained from soy-bean are mixed with 90 to 95 percent of fish oil or train oil (marine oil), which if necessary has been neutralized beforehand with ammonia. The lecithin can be uniformly distributed in the train oil, after which this mixture may be mixed in any desired proportion with water in order to obtain a lasting emulsion from which the oil does not subsequently separate again. In order to obviate the separation of calcium soaps it is convenient to use in the production of the emulsion, water free from calcium compounds, for example, condensed steam.

*Example 3*

10 kgs. vegetable lecithin are mixed with 50 to 60 kgs. water at ordinary temperature or heated up to 60 to 70° C., whereupon chrome leather is smeared with this mixture.

The swelled up mass of vegetable lecithin and water may also be diluted with a greater amount of water, the product thereby obtained may be used for greasing the leather in a revolving cask or drum. The lecithin penetrates into the pores of the skin and gives the leather the desired soft and supple quality.

*Example 4*

2 kgs. of the phosphatides obtained from soy-beans by lixiviating the same with a benzol-alcohol mixture, are mixed with 6 kgs. of neat's-foot oil and then heated on the water bath to 40 to 50° C., until a perfect solution is produced. From this solution there may if desired, be produced a uniform emulsion, by the addition of a little bit of ammonia or soda lye and warm water. This emulsion is run into a revolving drum containing 250 kgs. chrome leather and 500 to 1,000 kgs. of cold or warm water. After the drum has been rotated for three-quarters of an hour, the grease will be found to have been fully taken up by the leather.

*Example 5*

100 kgs. of soy-mash obtained from extracted oil of soy-beans, is dephlegmated and treated with 300 litres of acetic ether. By this procedure most all of the phosphatides is separated which may be worked up by further treatment for articles of human food. Considerable quantities of phosphatides and cleavage products of the same which are inappropriate for human food, remain mixed with the oil.

The acetic ether is distilled off whereby an oily mass having a proportion of 20 to 30 percent or more of lecithin is left behind. By mixing this oily mass with water, if necessary with a small addition of ammonia or alkali, a lasting emulsion is obtained, which may be used for greasing leather.

*Example 6*

30 parts of phosphatides obtained from soy-beans are mixed with 5 parts of an aromatic sulfonic acid, for example sulphonated butyl-naphthalene and dissolved in 100 parts of water. The thus obtained substance having a full alum-permanency may be used with success as a substitute for egg-yolk in producing the nourishing substance for glacé leather, especially with an addition of 5 to 10 percent of the albumen extracted from soy-beans.

*Example 7*

30 parts of oil-containing soy-lecithin having a proportion of 30 percent of lecithin are mixed with 3 parts of vegetable albumen, 67 parts of water and 3 parts of a 5% soda lye. Of this mixture 30 parts are diluted with 300 parts of water whereupon 50 parts of alum, 15 parts of common salt and 50 parts of wheat flour are added. This mixture is used in the dressing of glacé leather as the nourishing substance.

*Example 8*

A mixture is produced of 1 part of soy-phosphatide, 0.3 parts of potash soap, 2 parts of neat's-foot oil and 0.75 parts of train oil, by stirring well, while warming. This mixture is emulsified with water and then further quantities of water added until the desired dilution is attained.

For carrying the invention into practice, all organic phosphorus compounds of fatty character designated as lecithin or phosphatides and the phosphorus-containing cleavage products thereof, can be employed. The expression "phosphatide-like material" as hereinafter used, is intended to cover such materials.

The term "animal phosphatides" as used herein, is not intended to cover egg yolk or materials produced from egg yolk. No claim is made herein to compositions in which the whole or the main part of the phosphatides present is derived from egg yolk.

I claim:—

1. The herein described mode of dressing leather which comprises impregnating the leather with a material including a phosphatide of vegetable origin.

2. The herein described mode of dressing leather which comprises impregnating the leather with a material including a phosphatide of vegetable origin and a marine oil.

3. The herein described mode of dressing leather which comprises impregnating the leather with a material including an emulsion containing a phosphatide of vegetable origin.

4. The herein described mode of dressing leather which comprises impregnating the leather with an emulsion including a phosphatide from a vegetable material and train oil.

5. The herein described mode of dressing leather which comprises impregnating the leather with a composition including a phosphatide from a vegetable material, and an oily material.

6. The herein described mode of dressing leather which comprises impregnating the leather with a composition including phosphatide-like material from soy beans and an oily material.

7. The herein described mode of dressing leather which comprises impregnating the leather with a composition including phosphatide-like material from soy beans and a fatty oil.

8. The herein described mode of dressing leather which comprises impregnating the leather with an emulsion including water and phosphatide-like material from vegetable oil-bearing seeds and an oily material.

9. The herein described mode of dressing leather which comprises impregnating the leather with an emulsion including water and the phosphatide-like material from soybeans, and an oily material.

10. The herein described mode of dressing leather which comprises impregnating the leather with a material including phosphatide-like material from a vegetable substance and an oily material and an albumin.

11. The herein described mode of dressing leather which comprises impregnating the leather with a material including phosphatide-like material from a vegetable substance and an oily material and an alkaline substance.

12. The herein described mode of dressing leather which comprises impregnating the leather with an emulsion including soybean phosphatide, oily material, albumin, alkali and water.

13. The herein described mode of dressing leather which comprises impregnating the leather with a material including a phosphatide from an oil-bearing leguminous seed, an oil and a saponaceous material.

14. The herein described mode of dressing leather which comprises impregnating the leather with an emulsion including water and the phosphatide-like material from soybeans, and train oil.

15. The herein described mode of dressing leather which comprises impregnating the leather with a material including phosphatide-like material from a vegetable substance and train oil.

16. The herein described mode of dressing leather which comprises impregnating the leather with a material including a phosphatide from an oil-bearing leguminous seed and a sulphonated fatty oil.

17. The herein described mode of dressing leather which comprises impregnating the leather with a material including a phosphatide from an oil-bearing leguminous seed and a sulphonated body which can readily mix therewith.

18. A process which comprises the step of dressing leather with an emulsion including a phosphatide from oil-bearing seed and an oily material which includes a sulphonated organic material.

19. A process which comprises the step of dressing leather with an emulsion including a phosphatide from oil-bearing seed and an oily material which includes a sulphonated organic material and a marine oil.

20. The herein described mode of dressing leather which comprises impregnating the leather with a material including a greasy material including a phosphatide from an oil-bearing leguminous seed.

In testimony whereof I affix my signature.

BRUNO REWALD.